Feb. 1, 1966
W. H. NEBGEN
3,232,707
POWER RECOVERY IN AMMONIA SYNTHESIS
Filed Oct. 30, 1962
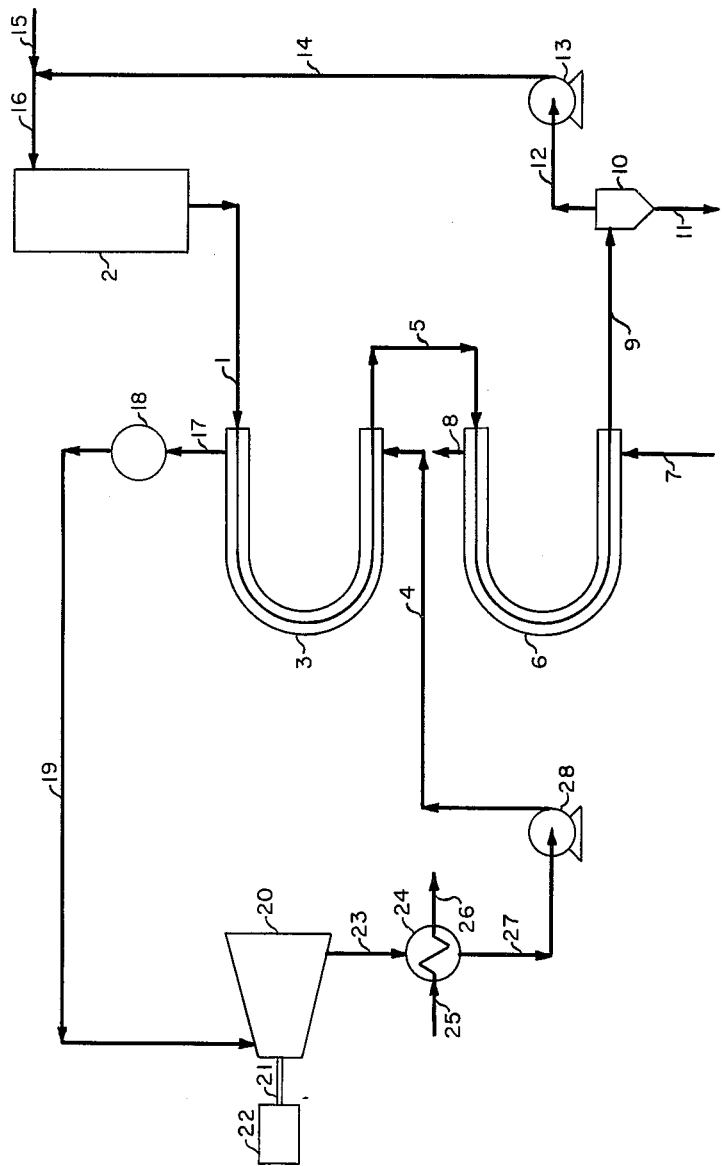
WILLIAM H. NEBGEN
*INVENTOR.*
BY J. T. Chaloty
*AGENT*

United States Patent Office 3,232,707
Patented Feb. 1, 1966

3,232,707
POWER RECOVERY IN AMMONIA SYNTHESIS
William H. Nebgen, Woodside, N.Y., assignor to Chemical Construction Corporation, New York, N.Y., a corporation of Delaware
Filed Oct. 30, 1962, Ser. No. 234,066
4 Claims. (Cl. 23—199)

This invention relates to the production of synthetic ammonia. A method of heat recovery has been devised, which achieves the recovery of previously wasted heat as usable power. A volatile organic liquid is vaporized in heat exchange with the synthesis loop gases, and the resulting vapor is expanded through power recovery means to generate usable power.

In ammonia synthesis, the hot synthesis gases leaving the catalytic converter have heretofore been cooled by heat exchange with water, in order to condense out the synthesized ammonia as a liquid product. The warmed water thus produced is cooled by passing over a cooling tower, and the cooled water is recycled for further cooling of the hot synthesis gases. It will be evident that this procedure does not recover the heat taken from the synthesis gases in any usable form, since this heat is removed at a low temperature level and is essentially wasted.

In the present invention, the stream of hot converter exit gas is cooled by heat exchange with a volatile organic liquid, which is passed to the heat exchange step at an elevated pressure. The organic liquid is thus vaporized at elevated pressure, and the resulting high pressure vapor is expanded through power recovery means such as a turbine. The turbine exhaust vapor at low pressure is condensed to liquid, and the liquid is pumped back to the cycle at the vaporization pressure. Thus, the heat removed from the hot converter exit gas in the form of organic vapor is utilized to produce useful work, in the expansion of the organic vapor. Thus, the principal advantage of the present invention is that previously wasted heat is recovered in the form of useful power.

It is an object of the present invention to usefully recover the heat available in an ammonia synthesis converter exit gas stream.

Another object is to recover the heat available in the ammonia converter gas stream in the form of useful power.

An additional object is to cool the ammonia converter gas stream in a more efficient manner, by usefully recovering the available heat.

A further object is to cool the ammonia converter gas stream and condense ammonia by heat exchange with a volatile liquid organic, so as to produce organic vapors at elevated pressure suitable for expansion through power recovery means.

These and other objects and advantages of the present invention will become evident from the description which follows. Referring to the figure, a preferred embodiment and arrangement of the present invention is presented, in which the converter exit gas stream is cooled to an intermediate temperature level by heat exchange with the organic liquid. In the figure, the hot converted synthesis gas stream 1 is discharged from converter 2, at a temperature typically in the range of 400° F. to 450° F. Stream 1 contains the synthesized ammonia, as well as unconverted hydrogen and nitrogen. Stream 1 is passed first to heat exchanger 3, which may be of tubular configuration. In unit 3, the hot gas stream is cooled, typically to an intermediate temperature in the range of 200° F. to 250° F., by heat exchange with a volatile organic liquid admitted into unit 3 via 4. The cooled gas stream leaves via 5, and passes next to a second heat exchanger 6. Here the gas stream is further cooled to a final temperature which is usually below 150° F., and condensation of liquid ammonia takes place. The gas stream is cooled in unit 6 by a suitable coolant such as liquid water, passed in via 7 and exiting via 8.

The cooled gas stream containing liquid ammonia leaves unit 6 via 9, and passes to separator 10. Here the liquid ammonia product is separated from the residual cycle gas stream of hydrogen and nitrogen. The liquid ammonia is passed to product utilization via 11, while the cycle gas stream 12 is returned to ammonia synthesis via blower 13 as stream 14. A stream 15 consisting of makeup gas is added to stream 14, and the combined stream 16 is passed into the high pressure catalytic ammonia converter 2.

Returning now to unit 3, stream 4 consists of a suitable volatile organic liquid of reasonable cost and having satisfactory thermodynamic efficiency. Thus, the refrigerants known as Freon 11 and Freon 12, which actually are fluorotrichloromethane and dichlorodifluoromethane, respectively, are highly suitable in the present case. Other eminently suitable organic liquids are propane and butane. In any case, stream 4 is passed into unit 3 at an elevated pressure, typically in the range of 150 p.s.i.a. to 250 p.s.i.a., and vaporization of the organic liquid takes place in unit 3. The resulting vapor stream passes upwards from unit 3 via 17, and into liquid separator 18. The vapor stream now passes via 19 into unit 20, which is a turbine or other suitable power recovery machine. Here the vapor stream is expanded and does useful work. Thus, for example, turbine 20 could be connected via shaft 21, to power consuming unit 22. Unit 22 is any suitable compressor, electrical generator, or other power consuming device.

The organic vapor is discharged from turbine 20 via 23 at a residual pressure, typically in the range of 20 p.s.i.a. to 50 p.s.i.a. Stream 23 now passes to condenser 24, which is cooled by cold water admitted via 25 and discharging via 26. The organic vapor is condensed to liquid, which is removed via 27, and is pumped by pump 28 to elevated pressure for recycle via 4.

It will be evident that various alternatives may be practiced within the scope of the present invention. Thus for example, the secondary water-cooled heat exchanger may be omitted in some cases, depending on the temperature of stream 4 and the amount of heat exchange surface provided in unit 3. Other types of heat exchangers besides tubular units 3 and 6 may be employed. Other variations will occur to those skilled in the art.

An example of an industrial application of the method of the present invention will now be described.

*Example*

The method of the present invention was applied in conjunction with a 350 tons/day ammonia plant. The hot converted gas stream was received from the catalytic converter at 425° F. This stream was cooled to 211° F. by heat exchange with liquid Freon 11, which was passed to the heat exchanger at 100° F. and 205 p.s.i.a. The resulting stream of Freon 11 vapor was passed to an expansion turbine at 260° F. and 205 p.s.i.a. and was expanded to 124° F. and 24 p.s.i.a. The turbine thus developed 1475 horsepower of available shaft power. The expanded vapor was condensed to liquid at 100° F. in a water-cooled condenser, with cooling water admitted at 85° F. and discharged at 95° F. The liquid Freon 11 was then pumped back to 205 p.s.i.a. for further heat exchange.

The synthesis gas stream was further cooled to 95° F. by a second heat exchange. In this case, cooling water was admitted to the unit at 85° F. and discharged at 115° F. Product liquid ammonia was then separated from the synthesis gas stream, and the residual gas stream was combined with makeup gas and recycled to the ammonia synthesis converter.

I claim:

1. In an ammonia synthesis process in which a synthesis gas mixture of nitrogen and hydrogen is passed through a catalytic converter at elevated pressure and temperature, whereby a portion of the gas mixture is converted to ammonia, the resulting hot gas mixture is cooled to condense liquid ammonia, the liquid ammonia product is separated from the residual synthesis gas mixture, and the residual synthesis gas mixture together with makeup gas mixture is recycled for further catalytic ammonia synthesis, the improved method of recovering heat from the hot gas mixture as usable power which comprises cooling the hot gas mixture by heat exchange with a volatile organic liquid at elevated pressure, whereby said organic liquid is heated and vaporized, expanding the resulting organic vapor through mechanical power recovery means to a reduced pressure, cooling the organic vapor to condense said vapor to the liquid state, pumping the resulting organic liquid to elevated pressure, and recycling the organic liquid for further heat exchange with the hot gas mixture.

2. In an ammonia synthesis process in which a synthesis gas mixture of nitrogen and hydrogen is passed through a catalytic converter at elevated pressure and temperature, whereby a portion of the gas mixture is converted to ammonia, the resulting hot gas mixture is cooled to condense liquid ammonia, the liquid ammonia product is separated from the residual synthesis gas mixture, and the residual synthesis gas mixture together with makeup gas mixture is recycled for further catalytic ammonia synthesis, the improved method of recovering heat from the hot gas mixture as usable power which comprises cooling the hot gas mixture by heat exchange with an organic liquid at elevated pressure, said liquid being selected from the group consisting of Freon 11, Freon 12, propane and butane, whereby said organic liquid is heated and vaporized, expanding the resulting organic vapor through mechanical power recovery means to a reduced pressure, cooling the organic vapor to condense said vapor to the liquid state, pumping the resulting organic liquid to elevated pressure, and recycling the organic liquid for further heat exchange with the hot gas mixture.

3. In an ammonia synthesis process in which a synthesis gas mixture of nitrogen and hydrogen is passed through a catalytic converter at elevated pressure and temperature, whereby a portion of the gas mixture is converted to ammonia, the resulting hot gas mixture is cooled from an initial temperature in the range of 400° F. to 450° F. to a final temperature below 150° F. to condense liquid ammonia, the liquid ammonia product is separated from the residual synthesis gas mixture, and the residual synthesis gas mixture together with makeup gas mixture is recycled for further catalytic ammonia synthesis, the improved method of recovering heat from the hot gas mixture as usable power which comprises cooling the hot gas mixture to an intermediate temperature in the range of 200° F. to 250° F. by heat exchange with an organic liquid selected from the group consisting of Freon 11, Freon 12, propane and butane, said organic liquid being at an elevated pressure in the range of 150 p.s.i.a. to 250 p.s.i.a., whereby said liquid is heated and vaporized to produce high pressure vapor, expanding the resulting vapor through mechanical power recovery means to a reduced pressure in the range of 20 p.s.i.a. to 50 p.s.i.a., cooling the organic vapor to condense said vapor to the liquid state, pumping the resulting organic liquid to said elevated pressure in the range of 150 p.s.i.a. to 250 p.s.i.a., and recycling the organic liquid for further heat exchange with the hot gas mixture.

4. Process of claim 3, in which the synthesis gas mixture is cooled from the intermediate temperature in the range of 200° F. to 250° F. to a final temperature below 150° F. at which liquid ammonia is condensed, by a separate heat exchange with liquid water.

References Cited by the Examiner

UNITED STATES PATENTS

| | | | |
|---|---|---|---|
| 1,849,357 | 3/1932 | Pyzel | 23—199 |
| 1,875,926 | 9/1932 | Hughes | 23—199 |
| 1,954,317 | 4/1934 | Hobler | 23—162 |
| 2,494,561 | 1/1950 | Kemp | 23—198 |
| 2,955,917 | 10/1960 | Roberts et al. | 23—162 |

OTHER REFERENCES

Althouse and Turnquist, Modern Electric and Gas Refrigeration, Goodheart-Willcox Co., Inc., Chicago, 1950, page 35.

BENJAMIN HENKIN, *Primary Examiner.*

MAURICE A. BRINDISI, *Examiner.*

E. C. THOMAS, J. J. BROWN, *Assistant Examiners.*